United States Patent [19]

Van Winkle

[11] 3,853,936

[45] Dec. 10, 1974

[54] PROCESS FOR DISTILLATION OF TOLUENE DIISOCYANATE

[75] Inventor: Norman L. Van Winkle, Lake Charles, La.

[73] Assignee: Olin Corporation, New Haven, Conn.

[22] Filed: Feb. 5, 1973

[21] Appl. No.: 329,309

[52] U.S. Cl. ............ 260/453 SP, 202/158, 202/262, 203/72, 203/73, 203/77, 203/89, 203/99
[51] Int. Cl. .......................................... C07c 119/04
[58] Field of Search ................................ 260/453 SP

[56] References Cited
UNITED STATES PATENTS 3,219,678   11/1965   Kober et al. ........................ 260/453

3,694,323   9/1972   Cooper et al. ................... 260/453 X

Primary Examiner—Lewis Gotts
Assistant Examiner—Dolph H. Torrence
Attorney, Agent, or Firm—F. A. Iskander; T. P. O'Day

[57] ABSTRACT

In a toluene diisocyanate recovery and purification process, an improvement is disclosed for reducing the level of hydrolyzable chloride impurities in the purified product. This is achieved by carrying out the final distillation of toluene diisocyanate using two separate feed streams of different quality.

11 Claims, No Drawings

PROCESS FOR DISTILLATION OF TOLUENE DIISOCYANATE

This invention relates to an improvement in the art of distillation. More particularly the invention relates to an improved distillation method for the recovery of purified toluene diisocyanate.

Toluene diisocyanate is a valuable chemical intermediate which is used extensively in the production of polyurethane elastomers and foams. It is conventionally prepared by a process which comprises phosgenating a solution of toluene diamine in an inert organic solvent. The phosgenation product mixture is thereafter charged to a recovery and purification system in order to remove the solvent and side reaction products and thereby recover toluene diisocyanate in product-grade purity.

According to the prior art, the recovery and purification of toluene diisocyanate is achieved by a method which comprises fractionating this mixture into two fractions. Each fraction is then treated to concentrate the toluene diisocyanate content therein. The fractions are thereafter combined and charged to a final distillation column where residual and high boiling impurities are removed and product-grade toluene diisocyanate is provided.

However, this prior art process for the recovery and purification of toluene diisocyanate unfortunately does not ordinarily result in a product which can be directly used to full advantage in the production of polyurethane foam. This is due to the fact that the toluene diisocyanate so produced contains an unacceptable level, i.e., over 80 and in most instances over 90 parts per million parts by weight of the diisocyanate, of hydrolyzable chlorine in the form of HCl. At such levels these impurities exert a detrimental effect when the diisocyanate is used according to conventional methods in the preparation of polyurethane foam. For example the hydrolyzable chlorides are known to interfere with the foaming reaction and often have an adverse effect on the properties of the resulting foam.

To overcome this drawback, it has been necessary, according to the prior art, to resort to additional steps or operations designed to reduce the hydrolyzable chlorine impurities to acceptable levels, i.e., below 80 parts per million. For example, numerous methods have been disclosed in the patent literature for achieving this objective by chemical treatment methods. Along with being time-consuming and burdensome, such methods, because of the added expense involved in using them, add to the cost of producing the toluene diisocyanate.

Now an improvement has been found in the above-described method for recovering toluene diisocyanate, which improvement obviates the need for resorting to such additional steps. According to the invention, the two toluene diisocyanate fractions, instead of being combined, are charged as separate or individual streams to the final distillation column, with the higher-quality, i.e., higher concentration, fraction or stream entering the column at a point which is above the entry point for the lower-quality fraction or stream. Carried out in this manner, the final distillation of the toluene diisocyanate results in a distillate having a reduced level of hydrolyzable chlorine impurities and therefore readily suitable for the production of polyurethane foam.

The term "hydrolyzable chloride" as used in the specification and claims herein refers to available chlorine atoms which are loosely, rather than tightly, bound in a compound. Illustrative such compounds have the following formulas:

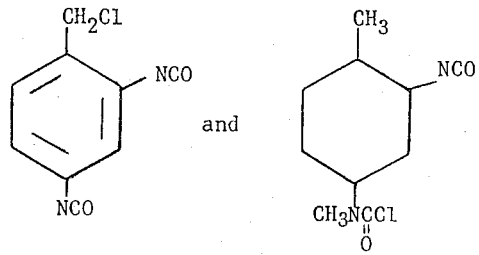

The content of hydrolyzable chloride can generally be determined for example by a method which involves reacting the available chlorine in the toluene diisocyanate composition with a hot water-alcohol solution. The content of hydrolyzable chlorine in the product is then determined by conventional methods such as by titration with a standardized silver nitrate solution.

It is to be understood that the method of the invention is not limited with respect to the particular method by which the toluene diisocyanate is prepared; nor is it restricted as to the particular type and number of operations which a toluene diisocyanate-containing mixture is subjected to before undergoing distillation according to the invention. Rather it is applicable to any toluene diisocyanate composition which contains at least about 90% and preferably about 97–99.95 percent by weight, of toluene diisocyanate, the remainder being comprised mainly of residual and high boiling materials, and which has been fractionated into two fractions of different quality before it is subjected to distillation. However, the invention is of particular utility in connection with the recovery of toluene diisocyanate from mixtures thereof which are derived from the phosgenation of toluene diamine, the latter being preferably used as a solution thereof in an inert, organic solvent.

The preparation of toluene diisocyanate by phosgenating the corresponding amine is well known in the art. See for example U.S. Pat. No. 3,287,387 which issued on Nov. 22, 1966. Briefly phosgene, usually in stoichiometric excess, is reacted with toluene diamine, usually after the latter is dissolved in an inert, organic solvent such as monochlorobenzene, the reaction being carried out at elevated temperatures and pressures. Along with toluene diisocyanate, the phosgenation product mixture usually comprises solvent, excess phosgene, hydrogen chloride by-product, and side reaction products in the form residual and high boiling materials including hydrolyzable chloride species.

In recovering toluene diisocyanate from this mixture, first the hydrogen chloride and phosgene are removed by any convenient method. For example the mixture may be subjected to reduced pressure in order to bring about vaporization of these two ingredients which can then be removed as gases. Or, alternatively, the mixture may be processed through one or more phase separators from which the hydrogen chloride and phosgene are removed as overheads.

The remaining mixture is charged to a first distillation zone where it is divided into two fractions of different quality. Usually any suitable evaporator type distillation apparatus, such as a rising film and/or a falling film evaporator, is used for this purpose. The overhead fraction or stream from this distillation column is comprised mainly of toluene diisocyanate, solvent, and a fractional proportion of high boilers. The bottoms fraction contains substantial amounts of residual materials along with a major proportion, i.e., usually over 50 percent by weight, of toluene diisocyanate and a relatively small proportion of high boilers. Each fraction then undergoes further separatory operations before being charged to a final distillation column where the concentrated toluene diisocyanate undergoes final purification and a high quality product is obtained. Thus the overhead fraction is subjected to further distillation, using conveniently a second tray-type conventional distillation column, in order to remove the solvent therefrom and provide a product containing no more than about 1 percent and usually about 0.01–0.1 percent by weight of high boiling materials; and the bottoms fraction is processed through a thin film evaporator which enables the removal of a substantial proportion of the residual material contained therein, leaving however a product which contains a greater proportion of high boilers, i.e., usually up to about 15 times and more usually about 6–12 times, the proportion contained in the overhead fraction after the solvent has been stripped off therefrom.

As noted above, the two toluene diisocyanate fractions, which differ in quality with respect to their contents of high boiling impurities, undergo final distillation designed to further refine the toluene diisocyanate and yield a substantially pure product. Any suitable distillation apparatus may be used to achieve this final step, such as a conventional tray-type or packed distillation column, the latter being generally preferred.

In accordance with the improved process of the invention, the two toluene diisocyanate fractions are charged to the distillation column as separate streams and through separate inlets. This critical feature of the invention is to be distinguished from prior art practice wherein the two fractions are first combined or fed to the distillation column through a common inlet.

Another critical feature of the invention is that the high quality fraction, i.e., the fraction containing a lower percentage of high boiling impurities, be introduced into the distillation column through an inlet which is above the inlet for the low quality fraction. In practice, this may be done for example by locating the high quality fraction inlet in the upper two-thirds of the column but below the top one-tenth of the column; and locating the low quality fraction inlet in the lower one-third of the column. It is particularly preferred, however, that the high quality fraction inlet be located in about the middle one-third of the column and the low quality fraction inlet in about the bottom one-fifth of the column.

So long as these two criteria are observed, and provided further that the weight percentage of high boilers in the low quality fraction is at least four times that of the high quality fraction, a substantial reduction is achieved in the proportion of hydrolyzable chloride impurities contained in the toluene diisocyanate which is recovered as overheads from the column.

Although the two toluene diisocyanate streams can be fed to the column at any suitable rates, in practice the feed rate for the high quality stream is usually about 1–20, and preferably about 3–12, times the feed rate for the low quality stream. Otherwise, the distillation column, in which distillation is preferably carried out at sub-atmospheric pressure, is operated according to conventional methods and using previously established parameters which are generally employed in the distillation-purification of toluene diisocyanate.

According to a particularly preferred embodiment of the invention, the distillation is carried out in a conventional, packed column having two separate packed sections, one section being located in the middle of the upper half of the column and the other section being located in the middle of the lower half of the column. The high quality toluene diisocyanate stream or fraction is introduced into the column through an inlet near the midpoint thereof and between the two packed sections. The low quality toluene diisocyanate fraction is charged to the column through an inlet located in the vicinity of the bottom of the column and below the second or lower packed section. A feed rate ratio, high quality fraction to low quality fraction, of between about 5:1 and about 11:1 is used on a continuous basis, accompanied by the continuous withdrawal of toluene diisocyanate distillate from the top of the column and accumulated undesirable residue and high boilers from the bottom of the column.

The improved process of the invention provides a simple and economical expedient for recovering toluene diisocyanate in which the hydrolyzable chlorine content is reduced to acceptable levels, i.e., below 80 parts per million. This objective is achieved according to the invention without resorting to any additional steps or chemical treatment methods which have henceforth been necessary in connection with prior art recovery methods. Toluene diisocyanate recovered according to the process of the invention can be directly used to full advantage in the preparation of polyurethane elastomers and foams.

The following examples are provided to illustrate the invention. In these examples, two toluene diisocyanate fractions are used, a high quality fraction containing as impurities 0.03 percent by weight of high boilers and about 0.1 percent by weight of residual material and a low quality fraction containing as impurities 0.3 percent by weight of high boilers along with about 0.2 percent by weight of residual material. These two fractions had been prepared by a well-known prior art method involving the following steps: (a) phosgenation of a monochlorobenzene solution of toluene diamine, (b) removal of excess phosgene and by-product hydrogen chloride from the phosgenation product mixture, (c) fractional distillation of the remaining mixture into an overhead fraction comprised of toluene diisocyanate, monochlorobenzene and a fractional amount of residue and high boilers, and a bottoms fraction comprised of toluene diisocyanate, residue and a small proportion of high boilers, (d) stripping the monochlorobenzene from the overhead fraction thereby obtaining the high quality fraction used in the examples and (e) distilling the bottoms fraction by means of a thin film evaporator to remove most of the residue therein and thereby obtain the low quality fraction which is used in the examples.

EXAMPLE 1

Distillation of the two toluene diisocyanate fractions referred to above was carried out on a continuous basis using a distillation column having two separate packed sections, one section being located in the middle of the upper half of the column and the other section being located in the middle of the lower half of the column. The high quality fraction was continuously delivered to the column through an inlet located at about the middle thereof, between the two packed sections, at a rate of 103 pounds per minute. The low quality fraction was continuously fed at a rate of 18 pounds per minute, this fraction entering the column through an inlet located at about the bottom of the column below the lower packed section thereof. Continuous distillation was carried out using these constant feed rates with heat applied at the bottom of the column to maintain a suitable boil-up rate and with partial vacuum maintained overhead to achieve an overhead reduced pressure of about 20–30 mm. HG. This reduced overhead pressure was obtained by means of a vacuum pump. During a 24-hour run the reflux in the column averaged 42 pounds per minute and the temperature at the bottom of the column ranged between 325° and 360°F. Hourly samples of the distillate recovered as column overheads were analyzed for their content of hydrolyzable chlorine impurity in the following manner. A measured portion of each sample was hydrolyzed in order to convert the hydrolyzable chlorine therein to HCl. This was then titrated with a standard silver nitrate solution. Based on the amount of silver nitrate used, the hydrolyzable chlorine content in the sample was calculated and this averaged 75 ppm., with a low of 50 ppm. and a high of 78 ppm.

COMPARISON

The identical procedure of Example 1 was followed except that the two toluene diisocyanate fractions were combined and fed to the distillation column, as a single stream, through the midpoint inlet, i.e., the inlet which was used in Example 1 for charging the high quality fraction to the column. The average hydrolyzable chlorine impurity in the distillate was found to be 98 ppm. with a low of 83 ppm. and a high of 106 ppm. Thus this demonstrates that when the two toluene diisocyanate fractions are, contrary to the teaching of the invention, charged to the distillation column as a combined stream and through a single inlet, a marked increase in hydrolyzable chlorine obtains in the resulting distillate.

What is claimed is:

1. In a toluene diisocyanate recovery and purification process wherein two toluene diisocyanate streams are charged to a distillation column and distilled therein, namely, a high quality stream, containing no more than about 1 percent by weight of high boiling impurities, and a low quality stream, containing a proportion of high boiling impurities which is at least four times that of said high quality stream, the improvement which comprises charging said streams to said distillation column individually through separate inlets, the inlet for said high quality stream being located in the upper two-thirds, but below the top one-tenth, of said column, and the inlet for said low quality stream being located in the bottom one-third of said column, said high quality stream being charged to said column at a feed rate which is from about 1 to about 20 times that of said low quality stream.

2. The process of claim 1 wherein said two streams are obtained by a process which comprises fractionating a mixture derived from the phosgenation of toluene diamine.

3. The process of claim 2 wherein said distillation is carried out at subatmospheric pressure.

4. The process of claim 3 wherein said first stream is charged to said distillation column through an inlet located in about the middle one-third of said column and said second stream is charged to said distillation column through an inlet located in about the bottom one-fifth of the column.

5. The process of claim 4 wherein said toluene diamine is dissolved in an inert organic solvent before undergoing said phosgenation.

6. The process of claim 5 wherein each of said two streams contains at least about 90 percent of toluene diisocyanate and is substantially free of phosgene, by-product hydrogen chloride and said solvent.

7. The process of claim 6 wherein the proportion of said high boiling impurities in said second stream is up to about 15 times that of said first stream.

8. The process of claim 7 wherein said first stream is charged to said distillation column at a feed rate which is between about 5 and about 11 times the feed rate of said second stream.

9. The process of claim 8 wherein the proportion of said high boiling impurities in said second stream is between about 6 and about 12 times that of said first stream.

10. The process of claim 9 wherein said solvent is monochlorobenzene.

11. The process of claim 10 wherein said first stream is charged to said distillation column through an inlet located at about the middle of said column and said second stream is charged through an inlet located at about the bottom of said column.

* * * * *